(12) United States Patent
Cloutier et al.

(10) Patent No.: US 10,670,061 B2
(45) Date of Patent: Jun. 2, 2020

(54) CLAMP FOR CLAMPING A WINDSHIELD TO A FRAME OF A VEHICLE

(71) Applicant: BOMBARDIER RECREATIONAL PRODUCTS INC., Valcourt (CA)

(72) Inventors: Francis Cloutier, Sherbrooke (CA); Miguel Berthelette, Shefford (CA); Alexandre Lapointe, Sherbrooke (CA); Steve Do Rego, Granby (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 176 days.

(21) Appl. No.: 15/650,381

(22) Filed: Jul. 14, 2017

(65) Prior Publication Data

US 2018/0038401 A1   Feb. 8, 2018

Related U.S. Application Data

(60) Provisional application No. 62/370,309, filed on Aug. 3, 2016.

(51) Int. Cl.

| | |
|---|---|
| *F16B 5/06* | (2006.01) |
| *B60J 1/00* | (2006.01) |
| *B60J 10/72* | (2016.01) |
| *B60J 1/18* | (2006.01) |
| *B60K 1/00* | (2006.01) |
| *F16B 2/22* | (2006.01) |

(52) U.S. Cl.
CPC .............. *F16B 5/0685* (2013.01); *B60J 1/006* (2013.01); *B60J 1/18* (2013.01); *B60J 10/72* (2016.02); *B60K 1/00* (2013.01); *F16B 2/22* (2013.01)

(58) Field of Classification Search
CPC .. B60J 1/006; B60J 1/007; B60J 1/008; F16B 5/06; F16B 5/0685
See application file for complete search history.

(56) References Cited

U.S. PATENT DOCUMENTS

| 2,723,432 A | * | 11/1955 | Flora | F16L 3/04 248/73 |
|---|---|---|---|---|
| 5,086,589 A | * | 2/1992 | dibenedetto | B60J 5/0402 296/146.3 |
| 6,231,109 B1 | * | 5/2001 | Beaver | B60J 3/023 248/229.26 |
| 9,925,850 B2 | * | 3/2018 | Yoshida | B60J 1/004 |
| 2016/0121701 A1 | * | 5/2016 | Yoshida | B60J 1/004 49/372 |
| 2016/0159205 A1 | * | 6/2016 | Otani | B60J 1/006 296/146.15 |
| 2018/0111449 A1 | * | 4/2018 | McWhorter | B60J 1/006 |
| 2018/0244133 A1 | * | 8/2018 | Luo | B60J 1/006 |

* cited by examiner

*Primary Examiner* — Faye M Fleming
(74) *Attorney, Agent, or Firm* — BCF LLP

(57) ABSTRACT

A clamp for clamping an object having an aperture therethrough to a member is disclosed. The clamp passes through the aperture when clamping the object to the member. The clamp has a head portion defining a channel adapted for receiving an edge of the aperture; a body portion extending from the head portion; and a tail portion extending from the body portion. The tail portion has a member contacting surface shaped for wrapping around at least a portion of a perimeter of the member. A vehicle having a windshield clamped to a frame member using at least one such clamp is also disclosed.

21 Claims, 11 Drawing Sheets

CLAMP FOR CLAMPING A WINDSHIELD TO A FRAME OF A VEHICLE

CROSS-REFERENCE

The present application claims priority to U.S. Provisional Application No. 62/370,309, filed Aug. 3, 2016, the entirety of which is incorporated herein by reference.

FIELD OF TECHNOLOGY

The present technology relates generally to clamps for clamping an object having an aperture therethrough to a member, and more specifically for clamping a windshield to a frame of a vehicle.

BACKGROUND

Off-road side-by-side vehicles typically have a roll cage surrounding the cockpit area of the vehicle. These vehicles are often not provided with a windshield.

However, some users prefer to have a windshield. Such windshields are often mounted to the frame members of the roll cage such that the windshield is forward of the riders of the vehicle. Other users decide to install a windshield or not on the vehicle depending on the expected riding conditions.

Many systems use clamps to mount the windshield to the roll cage. Although these permit the installation and removal of the windshield, they require the use of tools which can be impractical and time consuming. Additionally, the hardware used with the clamps (i.e. nuts, bolts, washers, etc.) to attach the windshield and the clamps to the roll cage can be dropped and lost by the user during installation and/or removal.

There is therefore a desire for a system for installing a windshield to a roll cage of a vehicle that does not require the use of tools.

SUMMARY

It is an object of the present technology to ameliorate at least some of the inconveniences present in the prior art.

According to one aspect of the present technology, there is provided a clamp for clamping an object having an aperture therethrough to a member. The clamp passes through the aperture when clamping the object to the member. The clamp has a head portion defining a channel adapted for receiving an edge of the aperture; a body portion extending from the head portion; and a tail portion extending from the body portion. The tail portion has a member contacting surface shaped for wrapping around at least a portion of a perimeter of the member.

In some implementations of the present technology, the head portion has an object contacting portion. The object contacting portion is larger than the aperture in the object. The object contacting portion has an object contacting surface adapted for abutting a first surface of the object next to the aperture. A tab extends from the object contacting portion in a same direction as the body portion. The tab is adapted for abutting the edge of the aperture. A protrusion protrudes outwardly from the tab. The protrusion is adapted for abutting a second surface of the object next to the aperture. The second surface of the object is opposite the first surface of the object. The channel is defined by the object contacting surface, the tab and the protrusion.

In some implementations of the present technology, the tab is deformable for moving the protrusion off of the second surface of the object for releasing the edge of the object from the channel.

In some implementations of the present technology, the channel is a first channel, the tab is a first tab, and the protrusion is a first protrusion. The head portion also has a second tab extending from the object contacting portion in the same direction as the body portion and the first tab, the second tab being adapted for abutting the edge of the aperture; and a second protrusion protruding outwardly from the second tab, the second protrusion being adapted for abutting the second surface of the object next to the aperture. The object contacting surface, the second tab and the second protrusion define a second channel adapted for receiving the edge of the aperture.

In some implementations of the present technology, the body portion is disposed between the first and second tabs. The first and second protrusions protrude in opposite directions.

In some implementations of the present technology, the member contacting surface is offset from a plane. The plane is normal to the object contacting surface and is equally spaced from intersections of the first and second tabs with the object contacting portion.

In some implementations of the present technology, the body portion and the tail portion have a combined shape that is generally J-shaped.

In some implementations of the present technology, the member has a circular cross-section and the member contacting surface is an arc.

In some implementations of the present technology, the arc spans an angle between 90 degrees and 180 degrees.

In some implementations of the present technology, the tail portion defines an abutment surface at a free end thereof. The abutment surface permits force to be applied to the tail portion to disengage the tail portion from the member.

In some implementations of the present technology, a rib extends along the tail portion and the body portion. The rib is on a side of the tail portion opposite the member contacting surface.

In some implementations of the present technology, the object is a vehicle windshield and the member is a vehicle frame member.

According to another aspect of the present technology, there is provide a vehicle having a frame, the frame having a left frame member and a right frame member; at least two ground engaging members operatively connected the frame; a motor connected to the frame and operatively connected to at least one of the at least two ground engaging members; at least one seat connected to the frame; a windshield selectively connected to the frame, the windshield defining at least one aperture; and at least one clamp passing through the at least one aperture and clamping the windshield to a corresponding one of the left and right frame members. Each of the at least one clamp has a head portion clipping an edge defining a corresponding one of the at least one aperture; a body portion extending from the head portion; and a tail portion extending from the body portion. The tail portion has a member contacting surface shaped for wrapping around at least a portion of a perimeter of the corresponding one of the left and right frame members.

In some implementations of the present technology, the at least one aperture includes left and right apertures; and the at least one clamp includes left and right clamps.

In some implementations of the present technology, a majority of the left frame member is disposed to a left of the left aperture; and a majority of the right frame member is disposed to a right of the right aperture.

In some implementations of the present technology, the body portion of the left clamp is disposed laterally between the left frame member and a longitudinal centerline of the vehicle; and the body portion of the right clamp is disposed laterally between the right frame member and the longitudinal centerline.

In some implementations of the present technology, the left frame member is held between the member contacting surface of the left clamp and a left portion of the windshield disposed left of the left aperture; and the right frame member is held between the member contacting surface of the right clamp and a right portion of the windshield disposed right of the right aperture.

In some implementations of the present technology, a left compressible seal disposed between the left frame member and the left portion of the windshield; and a right compressible seal disposed between the right frame member and the right portion of the windshield.

In some implementations of the present technology, the left frame member is laterally offset from a central axis of the left aperture; the right frame member is laterally offset from a central axis of the right aperture; and the central axes of the left and right apertures are normal to the windshield.

In some implementations of the present technology, the central axes are laterally inward of the left and right frame members.

In some implementations of the present technology, for each of the at least one clamp, the head portion defines a channel adapted for receiving an edge of the at least one aperture.

In some implementations of the present technology, for each of the at least one clamp, the head portion has a windshield contacting portion, the windshield contacting portion being larger than the at least one aperture, the windshield contacting portion having a windshield contacting surface abutting a first surface of the windshield next to the at least one aperture; a tab extending from the windshield contacting portion in a same direction as the body portion, the tab abutting the edge of the at least one aperture; and a protrusion protruding outwardly from the tab, the protrusion abutting a second surface of the windshield next to the corresponding at least one aperture, the second surface of the windshield being opposite the first surface of the windshield. The channel is defined by the windshield contacting surface, the tab and the protrusion.

In some implementations of the present technology, for each of the at least one clamp, the tab is deformable for moving the protrusion off of the second surface of the windshield for releasing the edge of the windshield from the channel.

In some implementations of the present technology, for each of the at least one clamp: the channel is a first channel; the tab is a first tab; the protrusion is a first protrusion; and the head portion also has: a second tab extending from the windshield contacting portion in the same direction as the body portion and the first tab, the second tab abutting the edge of the at least one aperture; and a second protrusion protruding outwardly from the second tab, the second protrusion abutting the second surface of the windshield next to the at least one aperture. The windshield contacting surface, the second tab and the second protrusion define a second channel receiving the edge of the at least one aperture.

In some implementations of the present technology, for each of the at least one clamp: the body portion is disposed between the first and second tabs; and the first and second protrusions protrude in opposite directions.

In some implementations of the present technology, for each of the at least one clamp, the body portion and the tail portion have a combined shape that is generally J-shaped.

In some implementations of the present technology, for each of the at least one clamp, the corresponding one of the left and right frame members has a circular cross-section and the member contacting surface is an arc.

In some implementations of the present technology, for each of the at least one clamp, the arc spans an angle between 90 degrees and 180 degrees.

In some implementations of the present technology, for each of the at least one clamp, the tail portion defines an abutment surface at a free end thereof. The abutment surface permits force to be applied to the tail portion to disengage the tail portion from the corresponding one of the left and right frame members.

In some implementations of the present technology, each of the at least one clamp also has a rib extending along the tail portion and the body portion. The rib is on a side of the tail portion opposite the member contacting surface.

In some implementations of the present technology, the at least one aperture includes upper left, lower left, upper right and lower right apertures; and the at least one clamp includes upper left, lower left, upper right and lower right clamps.

In some implementations of the present technology, the at least two ground engaging members are at least four wheels; the at least one seat includes two seats disposed side-by-side; the frame includes a roll cage; and the left and right frame members are left and right roll cage members.

For purposes of the present application, terms related to spatial orientation such as front, rear, up, down, left and right are to be understood as they would be understood by a driver of a vehicle sitting therein in a normal driving position. However, when referring to a clamp alone, terms related to spatial orientation should be understood from a frame of reference where a top of the clamp corresponds to the head portion of the clamp and the bottom of the clamp corresponds to the tail portion of the clamp.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to an implementation of an off-road side-by-side vehicle. It is contemplated however that the present technology could be used on other implementations of off-road side-by-side vehicle or on other types of vehicles. The present also describe clamps used for connecting a windshield to frame members to a roll cage of a vehicle. It is contemplated however that the clamps could be used to connect other objects to other types of members. For example, a clamp as described herein could be used to connect a removable roof panel to a top of a vehicle, or to connect a removable panel to a frame of a temporary shelter.

Figure 1:
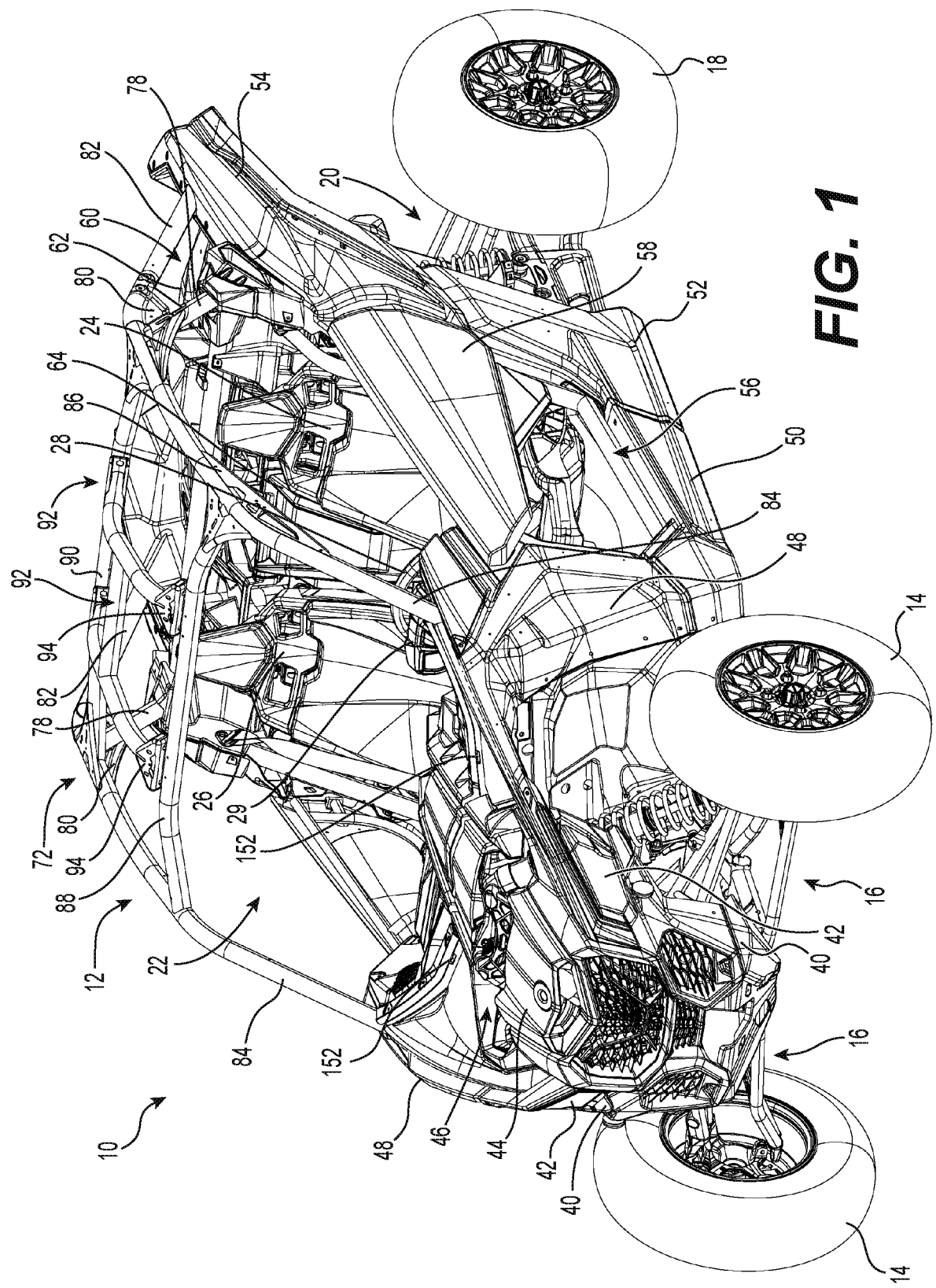
FIG. 1 is a perspective view, taken from a front, left side of an off-road side-by-side vehicle.

The general features of the off-road vehicle 10 will be described with respect to FIGS. 1 to 2. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. A steering wheel 28 is disposed in front of the driver seat 24. The steering wheel 28 is used to turn the front wheels 14 to steer the vehicle 10. Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

An engine 30 (schematically shown in FIG. 2) is connected to the frame 12 in a rear portion of the vehicle 10. The engine 30 is connected to a continuously variable transmission (CVT, not shown) disposed on a left side of the engine 30. The CVT is operatively connected to a transaxle (not shown) to transmit torque from the engine 30 to the transaxle. The transaxle is disposed behind the engine 30. The transaxle is operatively connected to the front and rear wheels 14, 18 to propel the vehicle 10. A fuel tank 32 (FIG. 2) is suspended from the frame 12 in front of the passenger seat 26. The fuel tank 32 is disposed above the floor of the cockpit area 22 to the right of a longitudinal centerline 34 (FIG. 3) of the vehicle 10. As can be seen in FIG. 2, a filler neck 36 that is selectively closed by a cap 38 extends upward, rightward and rearward from a top, right and rear portion of the fuel tank 32. A fuel pump (not shown) is inserted through a top of the fuel tank 32.

Turning back to FIG. 1, body panels of the vehicle 10 will be described. The body panels are connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 46 through which tops of the front suspension assemblies 16 protrude as will be described in greater detail below. Front fenders 48 are disposed rearward of the front panels 40 on each side of the vehicle 10. Each front fender 48 is disposed in part above and in part behind of its corresponding front wheel 14. Lower panels 50 extend along the bottom of the frame 12 between the front and rear wheels 14, 18. As can be seen in FIG. 1 for the left lower panel 50, each lower panel 50 has a front end disposed under the bottom portion of its corresponding front fender 48 and extends rearward therefrom. A generally L-shaped panel 52 is disposed behind the rear end of each lower panel 50. Generally L-shaped rear fenders 54 extend upward and then rearward from the rear, upper ends of the L-shaped panels 52. Each rear fender 54 is disposed in part above and in part forward of its corresponding rear wheel 18. The rear fenders 54 define apertures at the rear thereof to receive the brake lights and/or reflectors (not shown) of the vehicle 10.

On each side of the vehicle 10, the front fender 48, the lower panel 50, the L-shaped panel 52 and the rear fender 54 define a passage 56 through which a driver (or passenger depending on the side of the vehicle 10) can enter or exit the vehicle 10. Each side of the vehicle 10 is provided with a door 58 that selectively closes an upper portion of the corresponding passage 56. Each door 58 is hinged at a rear thereof to an associated portion of the frame 12 and is selectively connected at a front thereof to another corresponding portion of the frame 12 via a releasable latch (not shown). It is contemplated that each door 58 could be hinged at a front thereof and latched at a rear thereof.

The rear fenders 54 define a cargo space 60 therebetween behind the seats 24, 26. The cargo space 60 has a floor 62 extending horizontally between the rear fenders 54. The floor 62 has a plurality of apertures such that the floor 62 can act as an attachments base to receive anchors such as those described in U.S. Pat. No. 8,875,830, issued Nov. 4, 2014, the entirety of which is incorporated herein by reference, in order to secure various items in the cargo space 60. It is contemplated that hooks or loops could be provided instead of or in addition to the apertures in the floor 62. It is also contemplated that the floor 62 could not be provided with any attachment features. It is contemplated that the floor 62 could be replaced by a cargo box that can be tilted in order to dump its content. A separation panel 64 extends laterally and is disposed longitudinally between the seats 24, 26 and the floor 62. As a result, the separation panel 64 separates the cockpit area 22 from the cargo area 60.

Figure 2:
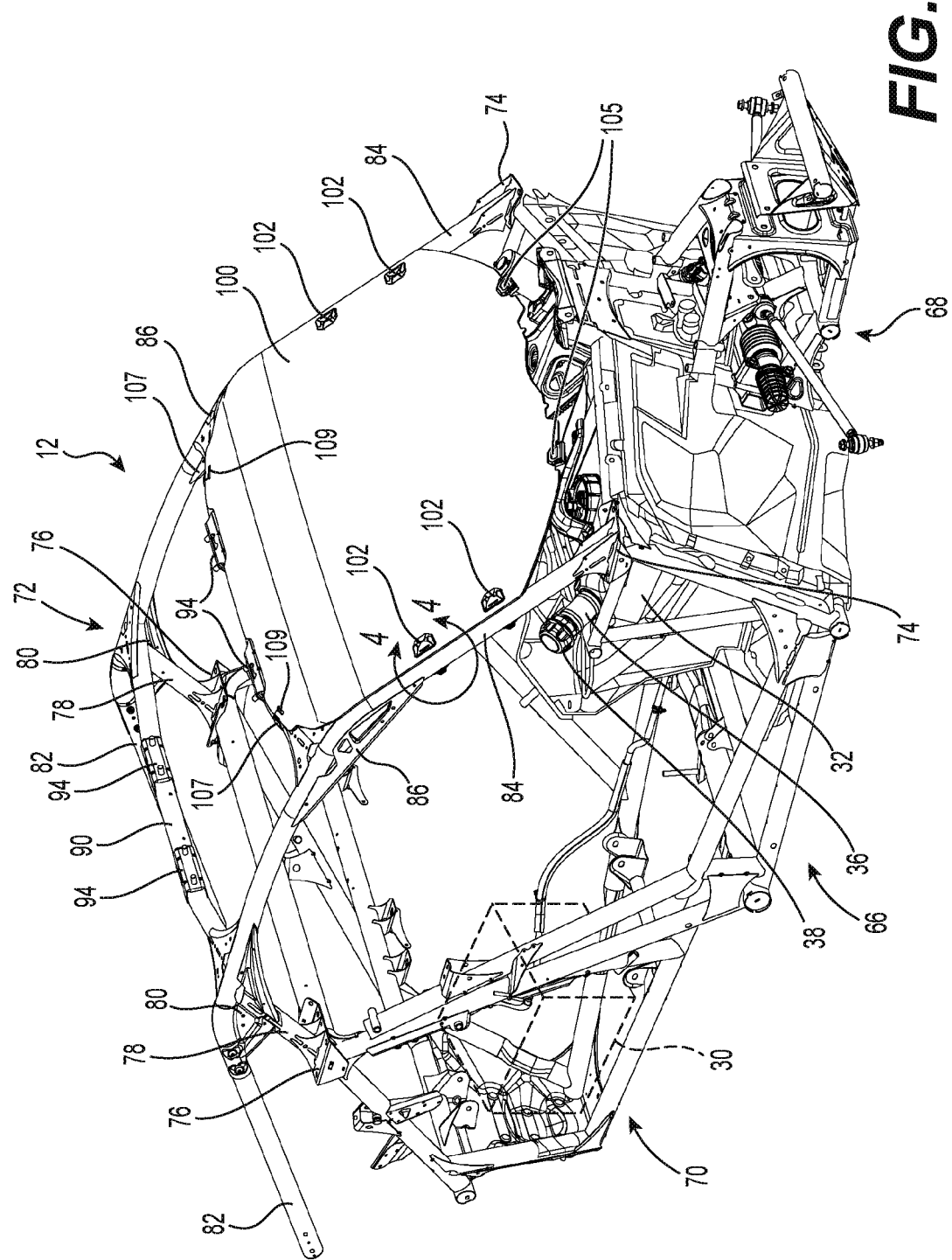
FIG. 2 is a perspective view, taken from a front, right side of a frame and other internal components of the vehicle of FIG. 1 with a windshield installed on the roll cage with clamps.
Figure 3:
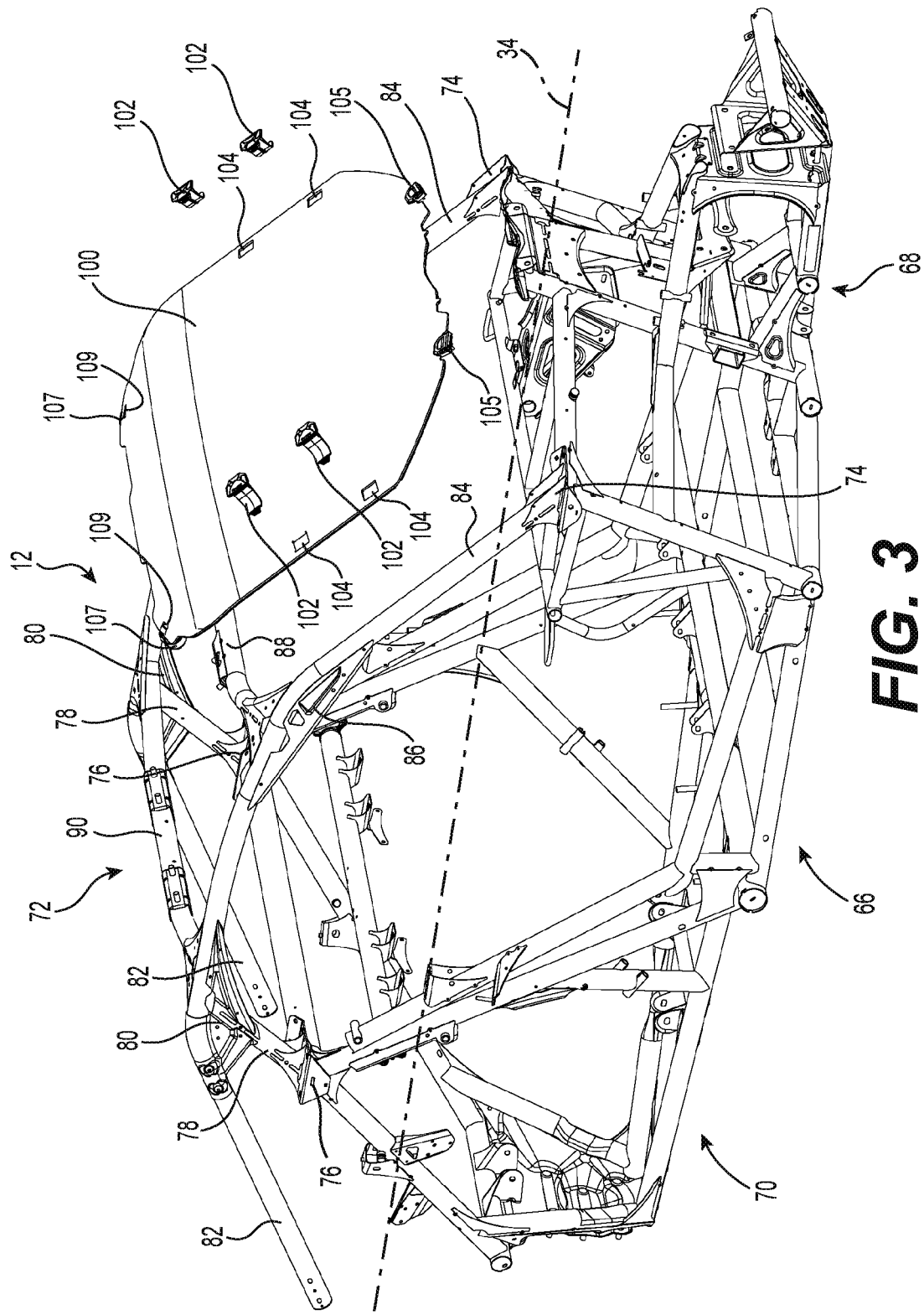
FIG. 3 is a perspective view, taken from a front, right side of the frame and components of FIG. 2 with the windshield and clamps removed from the roll cage.

Turning now to FIGS. 2 and 3, the frame 12 of the vehicle 10 will be described. The frame 12 has a central portion 66, a front portion 68 and a rear portion 70. As their names suggest, the front portion 68 is disposed in front of the central portion 66 and the rear portion 70 is disposed behind the central portion 66. The central portion 66 defines the cockpit area 22 in which the seats 24, 26 are disposed. The central portion 66 also defines a roll cage 72, described in greater detail below. The front suspension assemblies 16 are connected to the central and front portions 66, 68 of the frame 12. The engine 30, the CVT and the transaxle are supported by the rear portion 70 of the frame 12. The rear suspension assemblies 20 are connected to the central and rear portions 66, 70 of the frame.

The roll cage 72 is made of various frame members (i.e. legs and cross-members) described below. The roll cage 72 is connected at its front to brackets 74 and at its rear to brackets 76. In the present implementation, the roll cage 72 is welded to the brackets 74 and 76, but other connection methods are contemplated. Legs 78 are connected to and extend upward and forward from the brackets 76. The upper ends of the legs 78 are received in and connected to connectors 80. Legs 82 have their upper ends received in the connectors 80. From the connectors 80, the legs 82 extend downward and rearward and connect at their lower ends to a cross-member (not shown) supporting the floor 62 of the cargo space 60. Legs 84 are connected to and extend upward and rearward from the brackets 74. The upper ends of the legs 84 are received in and connected to the connectors 80. The legs 84 are bent near their center points. Brackets 86 are provided at the bend in the legs 84. A front cross-member 88 (FIG. 3) is connected to and extends between the legs 84. The cross-member 88 is connected to the legs 84 at points disposed slightly rearward of the bends in the legs 84. The cross-member 88 has two angled portions and a lateral portion disposed between the angled portions. The angled portions of the cross-member 88 extend upward, rearward and laterally inward from the legs 84. A rear cross-member 90 is connected to and extends between the legs 84. The cross-member 90 is disposed rearward of the cross-member 88. The cross-member 90 is connected to the legs 84 at points disposed forward of the upper ends of the legs 78. The cross-member 90 has two angled portions and a lateral portion disposed between the angled portions. The angled portions of the cross-member 90 extend rearward and laterally inward from the legs 84. The lateral portion of the cross-member 88 is longer than the lateral portion of the cross-member 90. A generally H-shaped frame structure 92 (FIG. 1) is connected by brackets 94 between the cross-members 88, 90. The H-shaped frame structure 92 extends over the central portion of the cockpit area 22. The H-shaped frame structure 92 is arched and is vertically higher than the top of the legs 84.

The frame 12 is made from a plurality of hollow cylindrical steel frame members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described below could be cast or otherwise formed as a single component. It is also contemplated that the frame 12 could have more or less members and brackets than described below depending on the type of materials used, the required strength and rigidity of the frame 12 and the weight of the components attached to the frame 12 for example.

As can be seen in FIGS. 2 and 3, the vehicle 10 has a windshield 100 that is selectively connected to the frame 12. As such, a user of the vehicle 10 has the option of installing the windshield 100 as shown in FIG. 2 or of removing the windshield 100 and using the vehicle 10 without the windshield 100 as shown in FIG. 1. The windshield 100 is installed onto the frame 12 through the use of clamps 102. The clamps 102 clamp the windshield 100 onto the roll cage 72, and more specifically onto the left and right frame members formed by the left and right legs 84. As can be seen in FIG. 3, the windshield 100 defines upper and lower left apertures 104 and upper and lower right apertures 104. In the present implementation, the apertures 104 are rectangular, but other shapes, including square and other polygonal and non-polygonal shapes are contemplated. Four clamps 102 are inserted through the apertures 104 to clamp the windshield 100 onto the legs 84 as will be described in greater detail below. It is contemplated that the windshield 100 could define only one or more than two apertures 104 per side in which case a corresponding number of clamps 102 would be provided. It is also contemplated that the windshield 100 could define one or more apertures 104 near an upper edge thereof such that a corresponding number of clamps 102 could be used to clamp the windshield 100 onto the frame member defined by the cross-member 88.

Two alignment blocks 105 (FIGS. 2 and 3) are connected to the bottom of the windshield 100. The alignment blocks 105 include pins (not shown) that assist in properly aligning the windshield 100 when installing the windshield 100 on the vehicle 10 as will be described below.

Two straps 107 pass through apertures 109 (FIGS. 2 and 3) defined in the top portion of the windshield 100. The straps 107 are wrapped around the cross-member 88 of the roll cage 72 to fasten the top of the windshield 100 to the cross-member 88. In the present implementation, the straps 107 are made of self-engaging hook and loop material, such as double-sided Velcro™, but other types of straps are contemplated. As described above, it is contemplated that the straps 107 and the aperture 109 could be replaced by clamps 102 and apertures 104.

With reference to FIGS. 6 to 12, the upper right clamp 102 will be described in more detail. The lower right, upper left and lower left clamps 102 are identical to the upper right clamp 102, and as such will not be described in detail herein.

Figure 9:
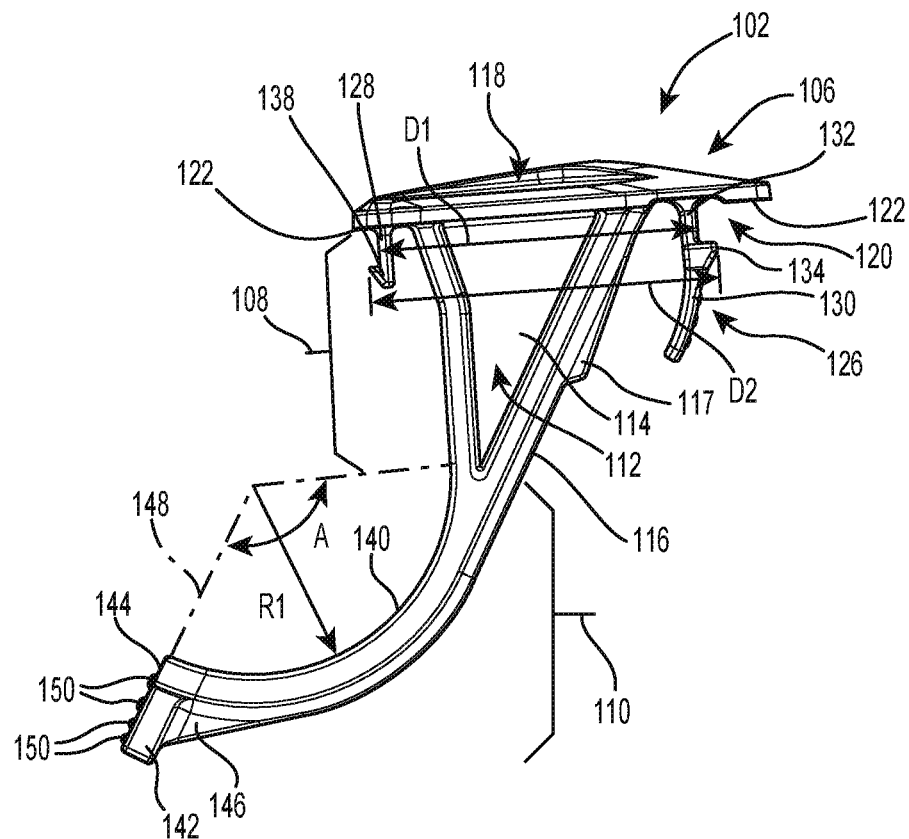
FIG. 9 is a front elevation view of the clamp of FIG. 6.

The clamp 102 has a head portion 106, a body portion 108 and a tail portion 110. With reference to FIG. 9, in the present implementation, the body portion 108 is the generally triangular portion, the head portion 106 is the portion disposed on top of the body portion 108 that is wider than the body portion 108 and from which the body portion 108 extends, and the tail portion 110 is the arcuate portion extending downward and rightward of the body portion 108. It is contemplated that in alternative implementations, the shapes of the portions 106, 108, 110 could differ from the ones being illustrated. In the present implementation, the head portion 106, the body portion 108 and the tail portion 110 are integrally formed by a molding process. It is contemplated that in some implementations, the head portion 106 could be made separately from the body portion 108 and the tail portion 110 and be fastened or bonded to the body portion 108. It is also contemplated that in some implementations, the tail portion 110 could be made separately from the body portion 108 and the head portion 106 and be fastened or bonded to the body portion 108. It is also contemplated that the head portion 106, the body portion 108 and the tail portion 110 could all be made separately and then be fastened or bonded to each other. It is also contemplated that one or more of the head portion 106, the body portion 108 and the tail portion 110 could be made of multiple parts that are fastened or bonded to each other to form the corresponding one of the head portion 106, the body portion 108 and the tail portion 110. In the present implementation, the clamp 102 is made of polycarbonate, but other materials are contemplated.

Figure 6:
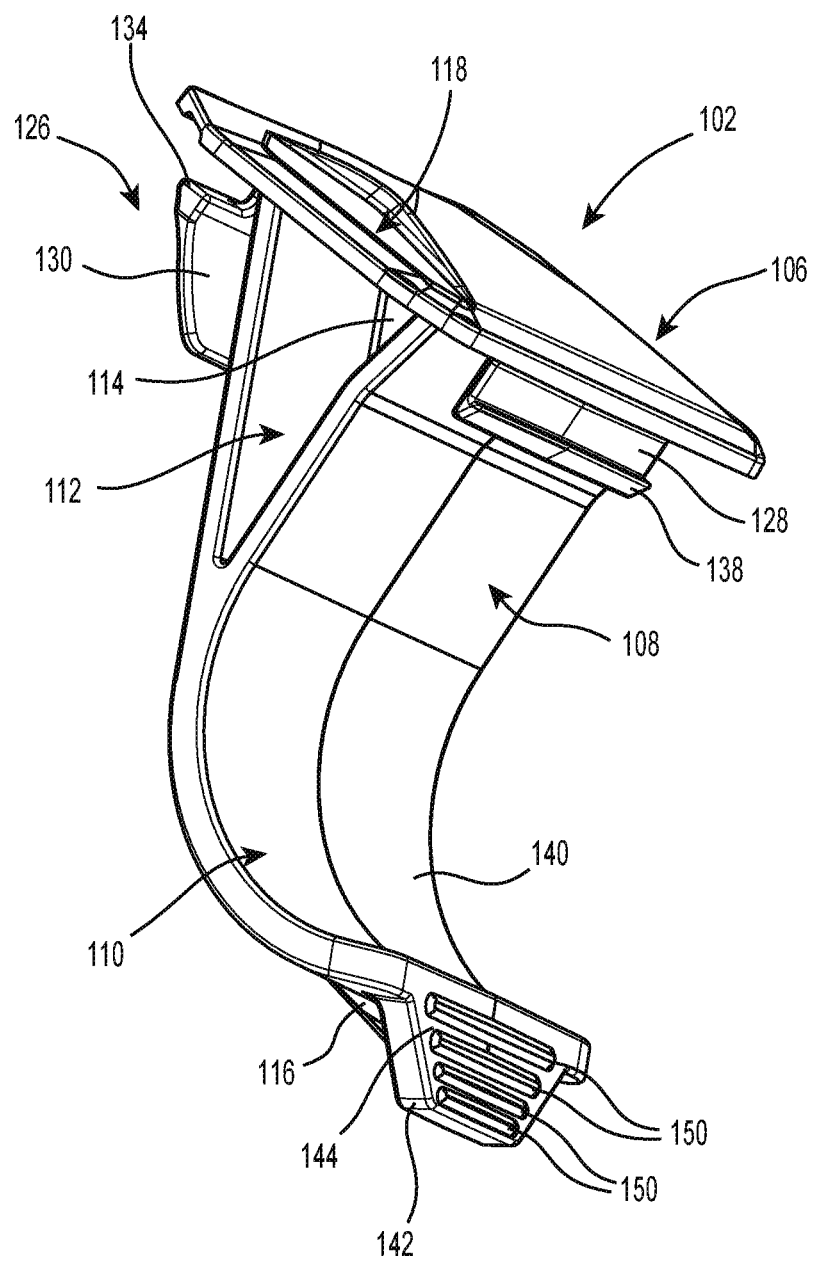
FIG. 6 is a perspective view, taken from a rear, right side of an upper right clamp of FIG. 3.
Figure 7:
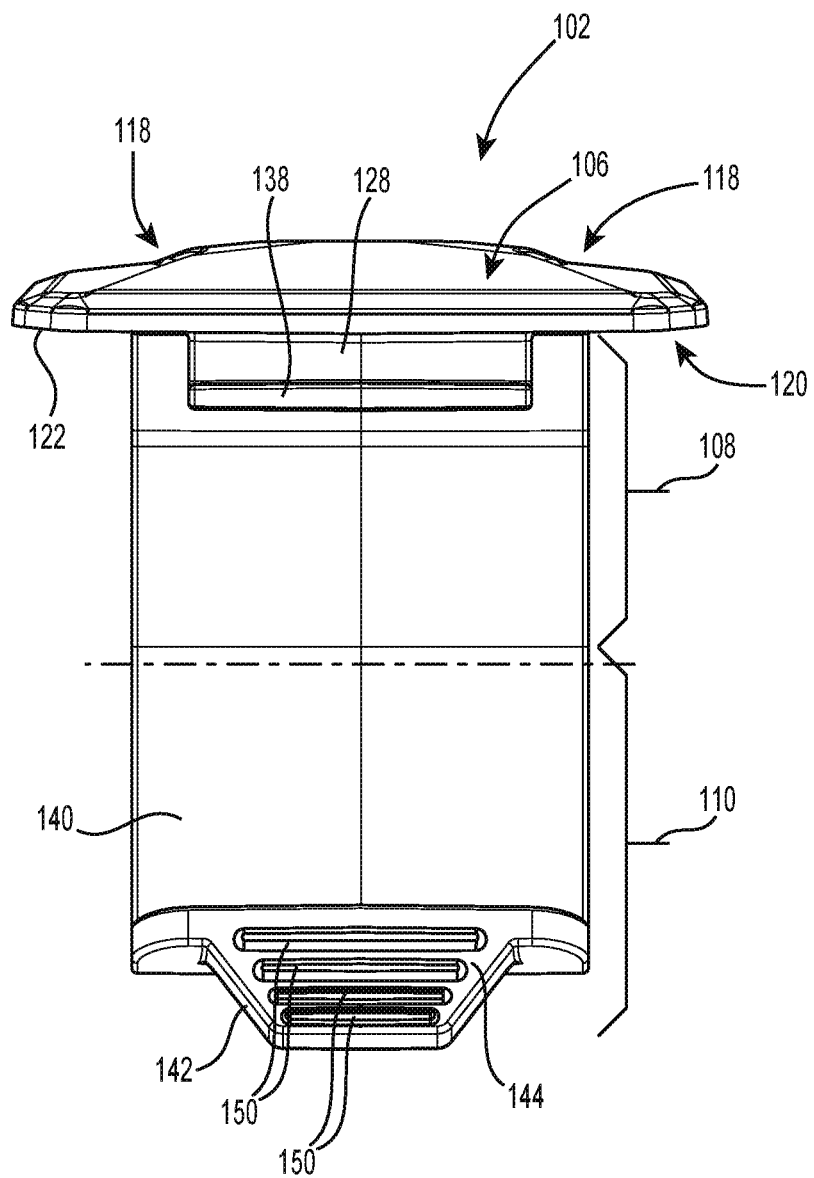
FIG. 7 is a right side elevation view of the upper right clamp of FIG. 6.
Figure 10:
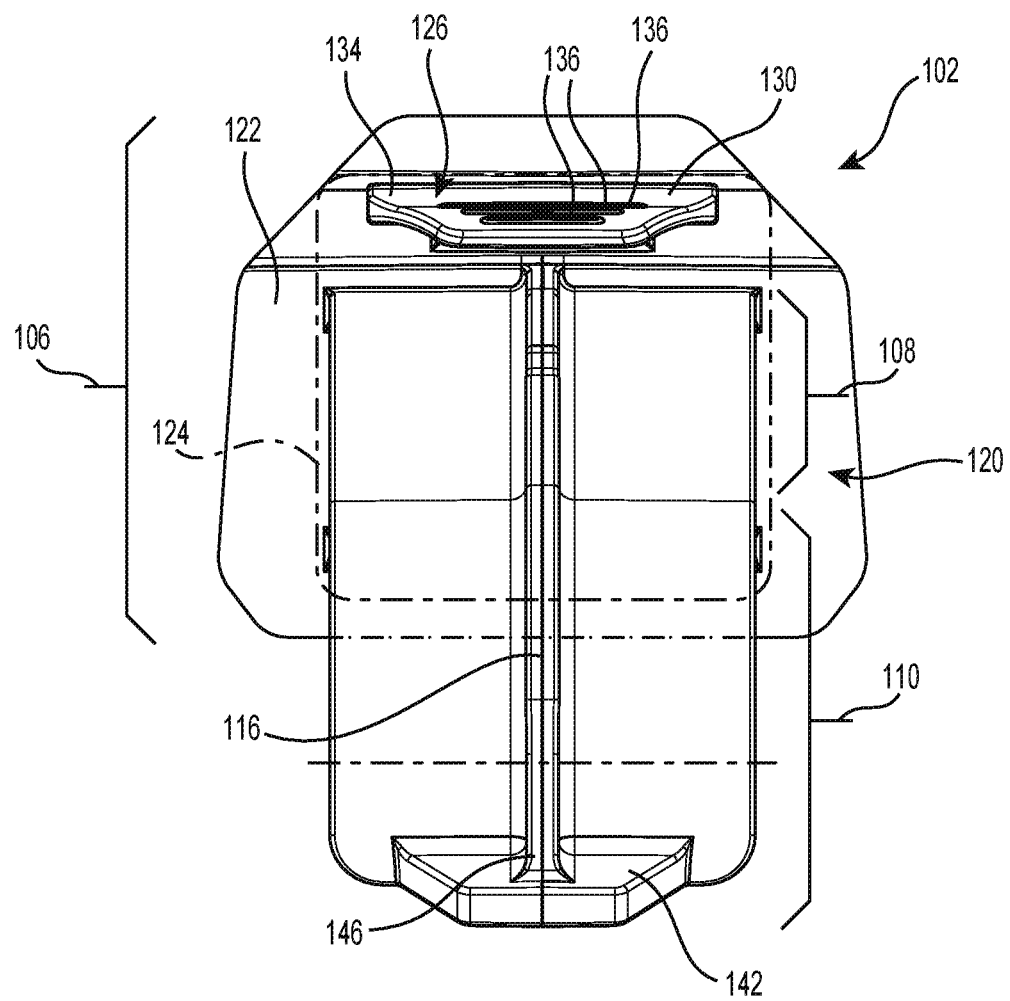
FIG. 10 is a bottom plan view of the clamp of FIG. 6.

As seen in FIGS. 6 and 9, the rear and front sides of the body portion 108 taper as it extends from the head portion 106 to the tail portion 110. As seen in FIGS. 7 and 10, the right and left sides of the body portion 108 has a constant width. The front and rear sides of the body portion 108 each have a recess 112 defined therein. The recesses 112 are separated by a central wall 114. The recesses 112 reduce the weight of the clamp 102. It is contemplated that the recesses 112 could be omitted. A rib 116 extends along a center of the left side of the body portion 108. The rib 116 reinforces the body portion 108. The rib 116 has a portion 117 that is thicker than the remainder of the rib 116 along the body portion 108 in order to provide additional reinforcement in that area. It is contemplated that more than one rib 116 could be provided. It is contemplated that the rib 116 could be omitted, in which case the body portion 108 may have to be made bigger and/or the recesses 112 may have to be smaller or be omitted. As can be seen and as will be described below, the rib 116 also extends along a center of the tail portion 110.

Figure 8:
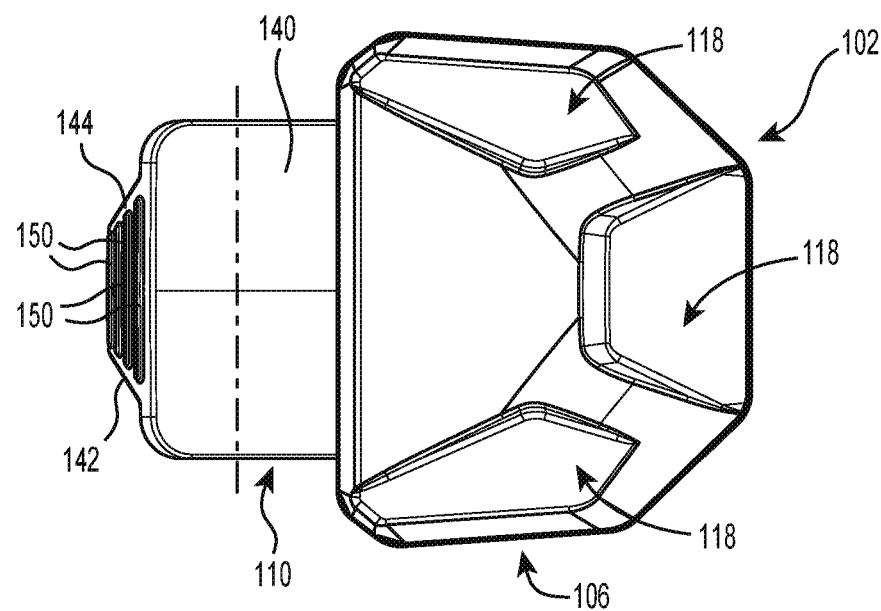
FIG. 8 is a top plan view taken from a head portion side of the clamp of FIG. 6.
Figure 11:
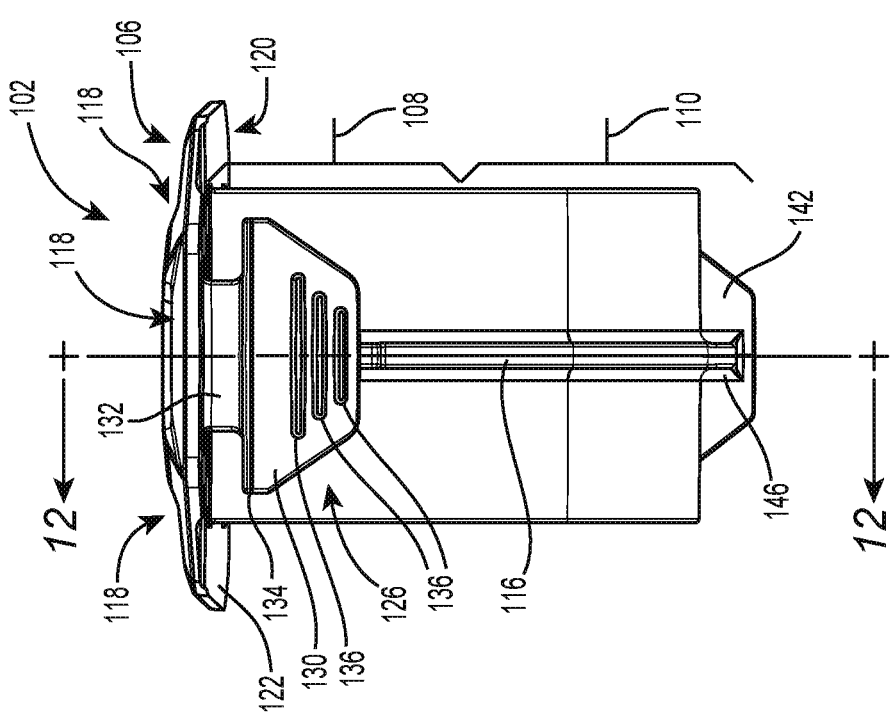
FIG. 11 is a left side elevation view of the clamp of FIG. 6.

The head portion 106 is connected to the wide end of the body portion 108. With reference to FIG. 8, it can be seen that the contour of the head portion 106 is shaped like an irregular hexagon having rounded corners. With reference to FIGS. 7, 9 and 11, it can be seen that the head portion 106 is thickest in the region that is generally aligned with the area where the left side portion of the body portion 108 meets with the head portion 106. From its thickest portion, the head portion 106 tapers toward its outer edges. The head portion 106 also defines three recesses 118 to reduce the weight of the clamp 102 and to facilitate handling of the clamp 102 by a user. It is contemplated that the head portion 106 of the clamp could have shapes other than the one illustrated in the figures.

Figure 5:
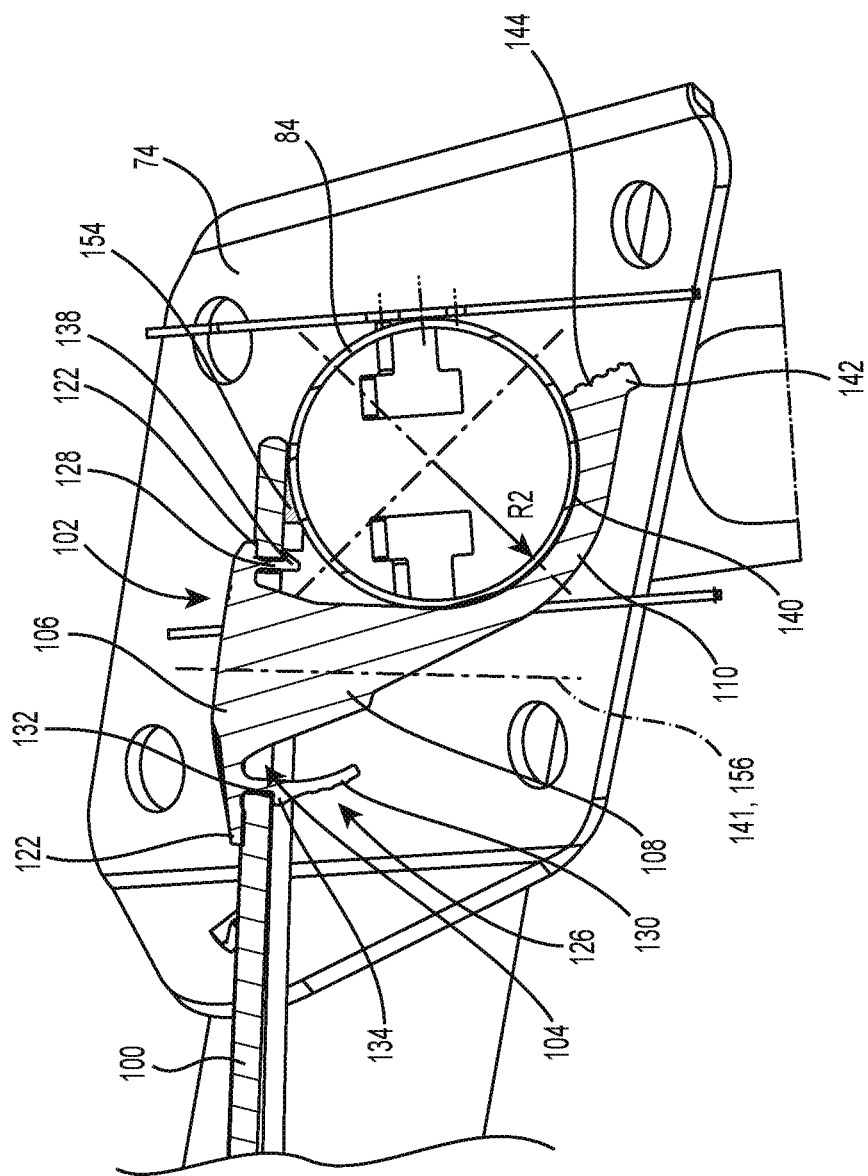
FIG. 5 is a cross-sectional view taken through line 5-5 of FIG. 4.

The lower portion of the head portion 106 is referred to herein as the windshield contacting portion 120. The windshield contacting portion 120 is larger than the aperture 104 as can be seen in FIG. 5. As the windshield contacting portion 120 is larger than the aperture 104, when the clamp 104 is installed as seen in FIG. 5, the windshield contacting portion 120 makes contact with the outer surface of the windshield 100, hence the name windshield contacting portion 120. The surface of the windshield contacting portion 120 that abuts the outer surface of the windshield 100 next to the aperture 104 is referred to herein as the windshield contacting surface 122. The windshield contacting portion 120 and the windshield contacting surface 122 are named in this manner since the object being clamped is the windshield 100, but are more generally referred to as an object contacting portion and an object contacting surface respectively. The windshield contacting surface 122 is the surface shown in FIG. 10 between the dash-dot line 124 and the outer edge of the windshield contacting portion 120. It is contemplated that the windshield contacting portion 120 could not have a windshield contacting surface 122 that is around the entire aperture 104. For example, the windshield contacting portion 120 could have a number of tabs that extend outward so as to make contact with the outer surface of the windshield 100 when the clamp 102 is installed.

The head portion 106 also defined two tabs 126, 128 that extend from the windshield contacting portion 120 of the head portion 106 in the same direction as the body portion 108. As can be seen the tab 126 is disposed on the left side of the body portion 108 and the tab 128 is disposed on the right side of the body portion 108. The tabs 126, 128 are spaced from the body portion 108.

With reference to FIGS. 9 and 11, the tab 126 has a tongue 130 and a narrower connecting portion 132 connecting the tongue 130 to the windshield contacting portion 120. The tab 126 is narrower than the corresponding side of the body portion 108 as best seen in FIG. 11. The upper edge of the tongue 130 forms a protrusion 134 extending to the left (i.e. outwardly) from the connecting portion 132. The left side of the windshield contacting surface 122, the left side of the connecting portion 132 and the protrusion 134 form a channel inside which the left edge of the upper right aperture 104 of the windshield 100 is received when the clamp 104 is installed. As can be seen in FIG. 5, when the left edge of the upper right aperture 104 of the windshield 100 is received in this channel, the windshield contacting surface 122 abuts the outer surface of the windshield 100 next to the upper right aperture 104, the connecting portion 132 of the tab 126 abuts the left edge of this aperture 104 and the protrusion 134 abuts the inner side of the windshield 100 next to this aperture 104. The tongue 130 is generally pentagonal in shape (as seen in FIG. 11) and curves slightly toward the body portion (as seen in FIG. 9). The tongue 130 defines an abutment surface having three small ribs 136. As will be discussed below, the tab 126 is deformable such that a user can apply a force on the abutment surface of the tongue 130 toward the body portion 108 with one or more fingers to release the edge of the aperture 104 from the above-described channel in order to remove the clamp 102 from the windshield 100. The tab 126 also deforms when inserting the clamp 102 into the aperture 104. The ribs 136 help in preventing the user's finger(s) from slipping on the abutment surface of the tongue 130. It is contemplated that there could be more or less than three ribs 136 or that the ribs 136 could be omitted. It is contemplated that the tongue 130 could have a shape that is different from the one illustrated in the figures.

The tab 128 is narrower than the corresponding side of the body portion 108 as best seen in FIG. 7. The lower end of the tab 128 has a protrusion 138 extending to the right (i.e. outwardly) thereof. The right side of the windshield contacting surface 122, the right side of the tab 128 and the protrusion 138 form a channel inside which the right edge of the upper right aperture 104 of the windshield 100 is received when the clamp 104 is installed. As can be seen in FIG. 5, when the right edge of the upper right aperture 104 of the windshield 100 is received in this channel, the windshield contacting surface 122 abuts the outer surface of the windshield 100 next to the upper right aperture 104, the tab 128 abuts the right edge of this aperture 104 and the protrusion 138 abuts the inner side of the windshield 100 next to this aperture 104. As will be discussed below, the tab 128 is deformable so as deform when inserting the clamp 102 into the aperture 104. The tab 128 also deforms slightly when a user pushes on the tongue 130 of the tab 126.

Figure 12:
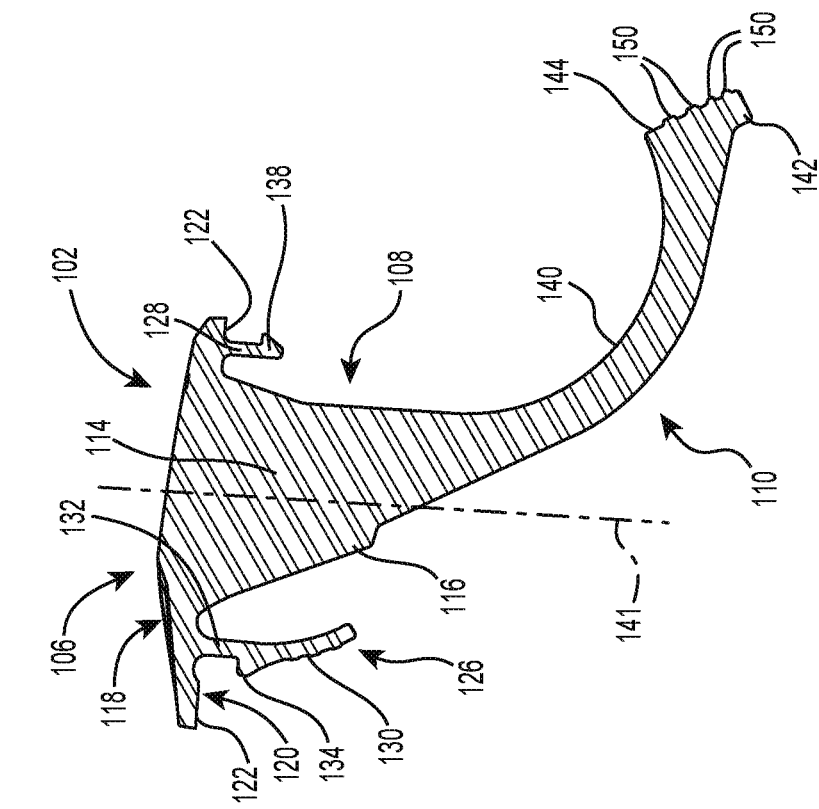
FIG. 12 is a cross-sectional view of the clamp of FIG. 6 taken through line 12-12 of FIG. 11.

With reference to FIG. 9, the distance D1 between the right surface of the tab 128 and the left surface of the connecting portion 132 of the tab 126 corresponds to a width of the upper right aperture 104. This distance D1 is smaller than the distance D2 between the outer tips of the protrusions 134, 138. As best seen in FIGS. 9 and 12, the outer surfaces of the protrusions 134, 138 are angled such that when the tabs 126, 128 make contact with the edges of the aperture 104 when inserting the clamp 102 into the aperture 104, the tabs 126, 128 deform inward, thus permitting the clamp 102 to be inserted until the windshield contacting surface 122 abuts the outer surface of the windshield 100 at which point the tabs 126, 128 spring back into their positions illustrated in FIG. 9. It is contemplated that the distance D1 could be slightly larger than the width of the aperture 104 such that when the clamp 102 is installed in the aperture 104 the tabs 126, 128 are still slightly deformed and apply a force against the edges of the aperture 104.

As best seen in FIGS. 9 and 12, the tail portion 110 is curved such that the body portion 108 and the tail portion 110 have a combined shape that is generally J-shaped. The tail portion 110 has a member contacting surface 140 shaped so as to wrap around a portion of the perimeter of the right frame member (i.e. the right leg 84 of the roll cage 72). In the present implementation, as can be seen in FIG. 5, the right leg 84 is circular. As such, in the present implementation, the member contacting surface 140 is an arc having a radius of curvature R1 equal to the radius of curvature R2 (FIG. 5) of the outer surface of the right leg 84. It is contemplated that the radius of curvature R1 of the arc defined by the member contacting surface 140 could be slightly smaller than the radius of curvature R2 of the outer surface of the right leg 84 such that when the member contacting surface 140 is wrapped around the right leg 84 it deforms slightly and applies a compressive force on the right leg 84. In the present implementation, the arc spans an angle A of about 120 degrees. It is contemplated that the angle A could be between 90 degrees and 180 degrees. It is contemplated that the shape of the member contacting surface 140 could not be congruent to the shape of the right leg 84. For example, in the present implementation where the right leg 84 is circular, it is contemplated that the member contacting surface 140 could form a three-sided channel sized such that each side of the channel contacts a different portion of the outer surface of the right leg 84 when the clamp 102 is installed to retain the right leg 84 in the channel. It is contemplated that the right leg 84 could have a non-circular perimeter in which case the member contacting surface 140 would be shaped to be congruent to a portion of this non-circular perimeter or would have a non-congruent shape that permits the member contacting surface 140 to wrap around the non-circular perimeter. As can be seen in FIG. 12, the member contacting surface 140 is offset from the plane 141. The plane 141 is normal to the windshield contacting surface 122 and is equally spaced from the intersections of the tabs 126, 128 with the windshield contacting portion 120.

The rib 116 extends from the body portion 108 as described above along a center of the side of the tail portion 110 opposite the member contacting surface 140. The rib 116 reinforces the tail portion 110. It is contemplated that more than one rib 116 could be provided along the tail portion 110. It is contemplated that the rib 116 could be omitted completely or could be omitted from only one of the body and tail portions 108, 110. In implementations where the rib 116 is omitted from the tail portion 110, it is contemplated that the tail portion 110 may be thicker. It is also contemplated that the rib 116 may not extend the whole length of the body and tail portions 108, 110 and/or may not extend continuously along the body and tail portions 108, 110. The tail portion 110 has a tab 142 defining an abutment surface 144 at a free end of the tail portion 110. The rib 116 has a portion 146 connected to the back of the tab 142 that is thicker than the remainder of the rib 116 along the tail portion 110 in order to provide additional reinforcement in that area. The abutment tab 142 is generally trapezoidal in shape as seen in FIG. 7. As can be seen in FIG. 9, a line 148 extending along the abutment surface 144 and extending therefrom passes through the center of curvature of the member contacting surface 140. It is contemplated that the abutment surface 144 could be oriented differently. The abutment surface 144 permits a user to apply a force to the tail portion 110 using one or more fingers to disengage the tail portion 110 from the right leg 84. The abutment surface 144 defines four ribs 150. The ribs 150 help in preventing the user's finger(s) from slipping on the abutment surface 144. It is contemplated that there could be more or less than four ribs 150 or that the ribs 150 could be omitted. It is contemplated that the tab 142 could have a shape that is different from the one illustrated in the figures.

Turning now to FIGS. 1 to 5 and 13A to 13C, the method of installing and removing the windshield 100 will be described.

To install the windshield 100, the windshield 100 is first positioned such that the pins of the alignment blocks 105 are inserted into corresponding aperture 152 (FIG. 1) in the body of the vehicle 10. This properly aligns the windshield 100 with respect to the roll cage 72. The windshield 100 is then placed to rest on the right and left legs 84 and the cross-member 88 of the roll cage 72. As can be seen in FIG. 5, a right seal 154 is bonded, or otherwise connected, next to the right edge of the windshield 100 to be disposed between the right portion of the windshield 100 and the right leg 84. A left seal and a top seal (not shown) are similarly provided next to the left and top edges of the windshield 100 respectively to be positioned between their respective portions of the windshield 100 and the left leg 84 and the cross-member 88 respectively.

In this position the right frame member (i.e. the right leg 84) is laterally offset from the central axis 156 of each of the right apertures 104 and the left frame member (i.e. the left leg 84) is laterally offset from the central axis (not shown) of each of the left apertures 104. The central axes of the apertures 104 are normal to the windshield 100. As can be seen for the upper right aperture 104 in FIG. 5, the right leg 84 is disposed completely to the right of the central axis 156 of the right apertures 104 and a majority of the right leg 84 is disposed to the right of the right aperture 104. Similarly, the left leg 84 is disposed completely to the left of the central axis of the left apertures 104 and a majority of the left leg 84 is disposed to the left of the left apertures 104. As such, the central axes of the right and left apertures 104 are disposed laterally inward of the right and left legs 84 of the roll cage 72. When installed as shown in FIG. 5, the plane 141 of each clamp 102 contains the central axis of its corresponding aperture 104 or is close to it.

Once the windshield 100 rests on the roll cage 72 as described above, the clamps 102 are inserted through the apertures 104. The straps 107 are also fastened to the cross-member 88. The manner of inserting the upper right clamp 102 into the upper right aperture 104 of the windshield 100 will now be described. The lower right clamp 104 is inserted in the lower right aperture 104 in the same manner and as such the manner of inserting this clamp 104 will not be described in detail herein. The lower and upper left clamps 104 are inserted in the lower and upper left apertures 104 in the same manner as the upper right clamp 104 but with the left/right orientations reversed as would be understood and as such the manner of inserting these clamps 104 will also not be described in detail herein. The order in which the four clamps 104 are inserted does not matter.

Figure 4:
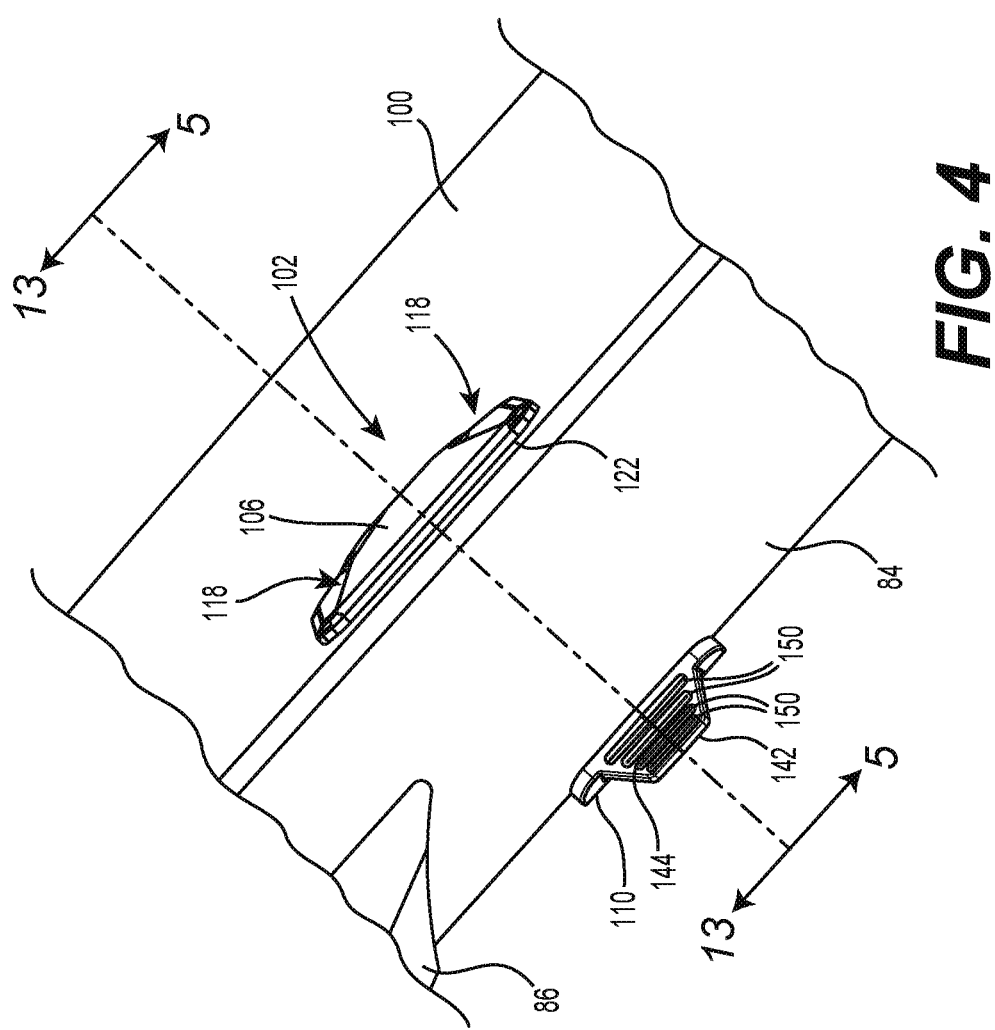
FIG. 4 is a close-up right side elevation view of section 4-4 of FIG. 2.
Figure 13A:
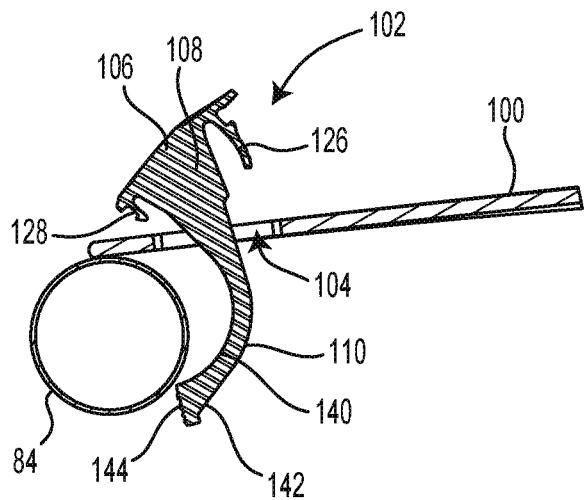
FIGS. 13A to 13C are cross-sectional views taken along line 13-13 of FIG. 4 illustrating the various steps for clamping (13A to 13C) or unclamping (13C to 13A) a clamp for attaching the windshield to a frame member of the roll cage of the vehicle of FIG. 1.
Figure 13B:
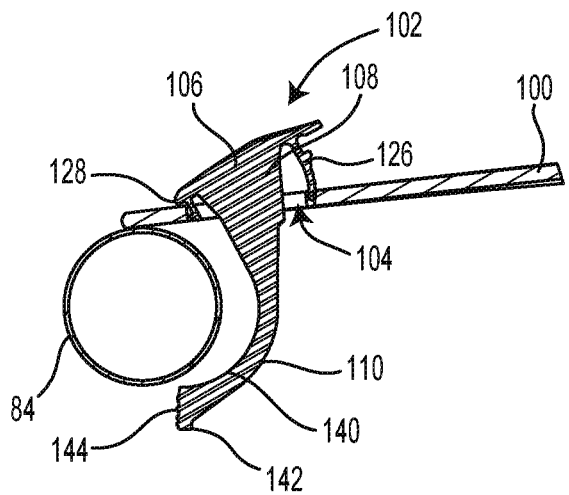
Figure 13C:
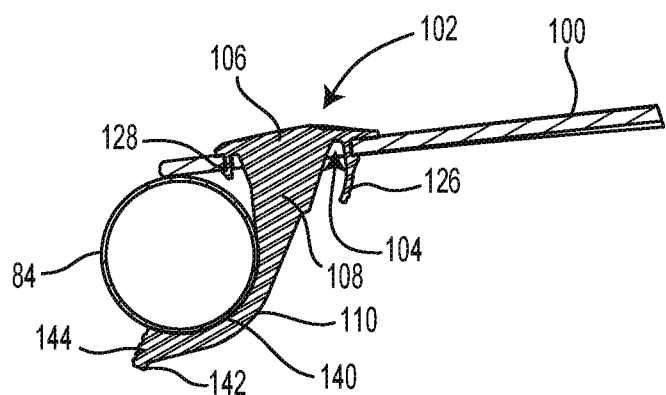

With reference to FIG. 13A, the clamp 102 is first angled with respect the windshield 100 and the tail portion 110 is inserted through the aperture 104 with the member contacting surface 140 generally facing the right leg 84. The clamp 102 continues to be moved toward the windshield 100 such that the body portion 108 passes partially through the opening 104 and the left edge of the head portion 106 touches the windshield 100 as shown in FIG. 13B. As the user continues to push on the head portion 106 toward the windshield 100, the clamp pivots clockwise (with respect to the orientation shown in FIGS. 13A to 13C) which causes the member contacting surface 140 of the tail portion 110 to wrap around the right leg 84, causes the tabs 126, 128 to first deflect inward and then return to their initial position as the protrusions 134, 138 clear the edges of the aperture 104, and the windshield contacting surface 122 of the head portion 106 abuts the windshield 100. In this position, the head portion 106 is clipped onto the edges of the aperture 104. More specifically, as shown in FIG. 5, the right edge of the aperture 104 is received in the channel defined by the windshield contacting surface 122, the tab 126 and the protrusion 134 and the left edge of the aperture 104 is received in the channel defined by the windshield contacting surface 122, the tab 128 and the protrusion 138. The upper right clamp 102 is now installed and retains the windshield 100 onto the right leg 84 as shown in FIGS. 4 and 5. The installed upper right clamp 102 pushes the windshield 100 toward the right leg 84 such that the right leg 84 is held between the member contacting surface 140 of the clamp 102 and the right portion of the windshield 100 disposed right of the upper right aperture 104. As a result, the right seal 154 is compressed between the right leg 84 and the right portion of the windshield 100. As would be understood from FIGS. 5 and 13C, when the clamp 102 is installed, the body portion 108 of the upper right clamp 102 is disposed laterally between the right leg 84 and the longitudinal centerline 34 of the vehicle 10.

Once all the clamps 102 are installed as described above, the windshield 100 is securely connected to the roll cage 72.

To remove the windshield 100, the clamps 102 are unclamped and removed from the windshield 100 and the straps 107 are unfastened from the cross-member 88. For the same reason as described above regarding the manner of installing the clamps 102, only the manner of removing the upper right clamp 102 will be described in detail herein. To unclamp the upper right clamp 102, the user who is inside the cockpit area 22 place the thumb of his right hand on the abutment surface 144 of the tail portion 110 and the index finger of the same hand on the abutment surface of the tongue 130 of the tab 126. The user then pushes against the abutment surface 144 and the abutment surface of the tongue 130 with his thumb and index finger in a pinching motion. The forces generated cause the tab 126 to deform so as to move the protrusion 134 off of the inner surface of the windshield 100 thus releasing the edge of the aperture from the channel formed in part by the tab 126 and then causes the clamp 102 to pivot counter-clockwise (with respect to the orientation shown in FIGS. 13A to 13C) thereby disengaging the tail portion 110 from the right leg 84. The user then simply pulls the clamp 102 out of the aperture 104. It is contemplated that the user may apply the forces required to remove the clamp 102 by using fingers other than the thumb and index finger of the same hand. For example, the user may use one or more fingers of one hand to push on the abutment surface 144 and one or more fingers of the other hand to push against the abutment surface of the tongue 130.

Once all four clamps 102 have been removed (in any desired order), the windshield 100 can be lifted off the roll cage 72 and removed from the vehicle 10.

In an alternative implementation which is not illustrated herein, the windshield 100 only has one or more apertures 104 along one side and the apertures 104 on the other side are replace by hooks fixed to the inner side of the windshield 100. In one exemplary implementation, the windshield 100 has one aperture on the right side and two hooks on the left side. To install this windshield 100, the windshield is positioned such that the left leg 84 is received inside the hooks. The windshield 100 is then pivoted downs about the left leg 84 until the right side of the windshield 100 rests against the right leg 84. A clamp 102 is then inserted into the right aperture 104 to clamp the right side of the windshield 100 onto the right leg 84 as described above. To remove the windshield 100, the clamp 102 is removed as described above, the windshield 100 is then pivoted up about the left leg 84 and is finally removed.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A clamp for clamping an object having an aperture therethrough to a member, the clamp passing through the aperture of the object when clamping the object to the member, the clamp comprising:
    a head portion defining a channel adapted for receiving an edge of the aperture of the object;
    a body portion extending from the head portion; and
    a tail portion extending from the body portion, the tail portion including a member contacting surface that is shaped to wrap around at least a portion of a perimeter of the member,
    when clamping the object to the member, the clamp being configured such that the tail portion is passed through the aperture of the object first.

2. The clamp of claim 1, wherein the head portion comprises:
    an object contacting portion, the object contacting portion being larger than the aperture in the object, the object contacting portion having an object contacting surface adapted for abutting a first surface of the object next to the aperture;
    a tab extending from the object contacting portion in a same direction as the body portion, the tab being adapted for abutting the edge of the aperture; and
    a protrusion protruding outwardly from the tab, the protrusion being adapted for abutting a second surface of the object next to the aperture, the second surface of the object being opposite the first surface of the object;
    wherein the channel is defined by the object contacting surface, the tab and the protrusion.

3. The clamp of claim 2, wherein the tab is deformable for moving the protrusion off of the second surface of the object for releasing the edge of the object from the channel.

4. The clamp of claim 2, wherein:
    the channel is a first channel;

the tab is a first tab;
the protrusion is a first protrusion; and
the head portion further comprises:
a second tab extending from the object contacting portion in the same direction as the body portion and the first tab, the second tab being adapted for abutting the edge of the aperture; and
a second protrusion protruding outwardly from the second tab, the second protrusion being adapted for abutting the second surface of the object next to the aperture; and
the object contacting surface, the second tab and the second protrusion define a second channel adapted for receiving the edge of the aperture.

5. The clamp of claim 4, wherein:
the body portion is disposed between the first and second tabs; and
the first and second protrusions protrude in opposite directions.

6. The clamp of claim 5, wherein the member contacting surface is offset from a plane, the plane being normal to the object contacting surface and being equally spaced from intersections of the first and second tabs with the object contacting portion.

7. The clamp of claim 1, wherein the body portion and the tail portion have a combined shape that is generally J-shaped.

8. The clamp of claim 1, wherein the member has a circular cross-section and the member contacting surface is shaped as an arc to accommodate the member circular cross-section.

9. The clamp of claim 8, wherein the arc spans an angle between 90 degrees and 180 degrees.

10. The clamp of claim 1, wherein the tail portion defines an abutment surface at a free end thereof, the abutment surface permitting force to be applied to the tail portion to disengage the tail portion from the member.

11. The clamp of claim 1, further comprising a rib extending along the tail portion and the body portion, the rib being on a side of the tail portion opposite the member contacting surface.

12. A clamp for clamping a vehicle windshield having an aperture therethrough to a vehicle frame member, the clamp passing through the aperture of the vehicle windshield when clamping the vehicle windshield to the vehicle frame member, the clamp comprising:
a head portion defining a channel adapted for receiving an edge of the aperture of the vehicle windshield;
a body portion extending from the head portion; and
a tail portion extending from the body portion, the tail portion including a member contacting surface that is shaped to wrap around at least a portion of a perimeter of the vehicle frame member.

13. A clamp for clamping a vehicle windshield having a windshield aperture therethrough to a vehicle frame member, the clamp passing through the windshield aperture when clamping the vehicle windshield to the vehicle frame member, the clamp comprising:
a head portion defining a channel adapted for receiving an edge of the windshield aperture;
a body portion extending from the head portion; and
a tail portion extending from the body portion, the tail portion including a frame member contacting surface that is shaped to wrap around at least a portion of a perimeter of the vehicle frame member,
when clamping the vehicle windshield to the vehicle frame member, the clamp being configured such that the tail portion is passed through the windshield aperture of the vehicle windshield first.

14. The clamp of claim 13, wherein the head portion comprises:
an object contacting portion, the object contacting portion being larger than the windshield aperture, the object contacting portion having an object contacting surface adapted for abutting a first surface of the vehicle windshield next to the windshield aperture;
a tab extending from the object contacting portion in a same direction as the body portion, the tab being adapted for abutting the edge of the windshield aperture; and
a protrusion protruding outwardly from the tab, the protrusion being adapted for abutting a second surface of the vehicle windshield next to the aperture, the second surface of the object being opposite to the first surface of the vehicle windshield;
wherein the channel is defined by the object contacting surface, the tab, and the protrusion.

15. The clamp of claim 14, wherein the tab is deformable for moving the protrusion off of the second surface of the vehicle windshield for releasing the edge of the vehicle windshield from the channel.

16. The clamp of claim 14, wherein:
the channel is a first channel;
the tab is a first tab;
the protrusion is a first protrusion; and
the head portion further comprises:
a second tab extending from the object contacting portion in the same direction as the body portion and the first tab, the second tab being adapted for abutting the edge of the windshield aperture; and
a second protrusion protruding outwardly from the second tab, the second protrusion being adapted for abutting the second surface of the vehicle windshield next to the windshield aperture; and
the object contacting surface, the second tab and the second protrusion define a second channel adapted for receiving the edge of the windshield aperture.

17. The clamp of claim 13, wherein the vehicle frame member has a circular cross-section and the frame member contacting surface is shaped as an arc to accommodate the frame member circular cross-section.

18. The clamp of claim 13, wherein the tail portion defines an abutment surface at a free end thereof, the abutment surface permitting force to be applied to the tail portion to disengage the tail portion from the vehicle frame member.

19. A unitary clamping device for clamping an object having an aperture therethrough to a member, the unitary clamp device passing through the aperture of the object when clamping the object to the member, the clamp comprising:
a head portion defining a channel adapted for receiving an edge of the aperture of the object;
a body portion extending from the head portion; and
a tail portion extending from the body portion, the tail portion including a member contacting surface that is shaped to wrap around at least a portion of a perimeter of the member,
when clamping the object to the member, the clamp being configured such that the tail portion is passed through the aperture of the object first;
wherein the head portion, body portion, and tail portion integrally form the unitary clamping device.

20. The unitary clamping device of claim 19, wherein the head portion comprises:

an object contacting portion, the object contacting portion being larger than the aperture in the object, the object contacting portion having an object contacting surface adapted for abutting a first surface of the object next to the aperture;

a tab extending from the object contacting portion in a same direction as the body portion, the tab being adapted for abutting the edge of the aperture; and a protrusion protruding outwardly from the tab, the protrusion being adapted for abutting a second surface of the object next to the aperture, the second surface of the object being opposite the first surface of the object;

wherein the channel is defined by the object contacting surface, the tab, and the protrusion.

21. The unitary clamping device of claim 20, wherein the tab is deformable for moving the protrusion off of the second surface of the object for releasing the edge of the object from the channel.

\* \* \* \* \*